(12) United States Patent
You

(10) Patent No.: US 10,574,357 B2
(45) Date of Patent: Feb. 25, 2020

(54) HEADEND FOR DISTRIBUTED ANTENNA SYSTEM AND OPERATING METHOD THEREOF

(71) Applicant: SOLiD, INC., Seongnam-si, Gyeonggi-do (KR)

(72) Inventor: Young Ju You, Incheon (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 16/381,259

(22) Filed: Apr. 11, 2019

(65) Prior Publication Data

US 2019/0238231 A1 Aug. 1, 2019

Related U.S. Application Data

(63) Continuation of application No. 15/848,172, filed on Dec. 20, 2017, now Pat. No. 10,298,328.

(30) Foreign Application Priority Data

Dec. 21, 2016 (KR) .......................... 10-2016-0175922
Dec. 21, 2016 (KR) .......................... 10-2016-0175937

(51) Int. Cl.
*H04B 10/00* (2013.01)
*H04B 10/2575* (2013.01)
*H04B 7/024* (2017.01)
*H04B 7/0413* (2017.01)
*H01Q 1/24* (2006.01)
(Continued)

(52) U.S. Cl.
CPC ....... *H04B 10/25754* (2013.01); *H01Q 1/246* (2013.01); *H04B 7/022* (2013.01); *H04B 7/024* (2013.01); *H04B 7/0413* (2013.01); *H04W 88/085* (2013.01)

(58) Field of Classification Search
CPC ........ H04B 10/25754; H04B 10/25753; H04B 10/2575; H04B 10/25759; H04B 10/40; H04B 10/25756; H04B 10/272; H04B 7/022; H04B 7/024; H04B 7/0413; H04B 10/25752; H04J 14/0232; H04J 14/0282;
(Continued)

(56) References Cited

U.S. PATENT DOCUMENTS 6,359,907 B1 * 3/2002 Wolters ..................... H04J 1/14
348/E7.07
6,674,966 B1 1/2004 Koonen
(Continued)

OTHER PUBLICATIONS

Office Action issued in parent U.S. Appl. No. 15/848,172 dated Jun. 14, 2018.
(Continued)

*Primary Examiner* — Hibret A Woldekidan
(74) *Attorney, Agent, or Firm* — Sughrue Mion, PLLC

(57) ABSTRACT

A head-end device according to an embodiment includes: a plurality of base station interfacing units configured to interface each of transmission/reception signals that are exchanged between the head-end device and a plurality of base stations; and a head-end control unit configured to receive an upper interfacing unit signal transmitted from an upper base station interfacing unit from among the plurality of base station interfacing units, and sequentially transmit the received upper interfacing unit signal to a lower base station interfacing unit.

8 Claims, 11 Drawing Sheets

(51) Int. Cl.
*H04B 7/022* (2017.01)
*H04W 88/08* (2009.01)

(58) Field of Classification Search
CPC .. H04J 14/0286; H04J 14/0249; H01Q 1/246; H04W 88/085
USPC ........... 398/76, 79, 98, 135, 115–117, 66–72
See application file for complete search history.

(56) References Cited

U.S. PATENT DOCUMENTS

| | | | |
|---|---|---|---|
| 8,346,091 B2 | 1/2013 | Kummetz et al. | |
| 9,112,549 B2 * | 8/2015 | Stapleton | H04B 7/026 |
| 9,735,872 B2 * | 8/2017 | You | H04B 10/29 |
| 9,859,982 B2 * | 1/2018 | Yeo | H04B 10/25753 |
| 10,298,328 B2 * | 5/2019 | You | H04B 7/022 |
| 10,341,159 B2 * | 7/2019 | Park | H04L 7/06 |
| 2012/0281565 A1 | 11/2012 | Sauer | |
| 2012/0327789 A1 * | 12/2012 | Grenier | H04L 43/10 370/252 |
| 2013/0121703 A1 * | 5/2013 | Kummetz | H04B 10/2575 398/115 |
| 2013/0195467 A1 * | 8/2013 | Schmid | H04B 1/0096 398/115 |
| 2013/0322214 A1 | 12/2013 | Neukirch et al. | |
| 2014/0064730 A1 * | 3/2014 | Ko | H04B 10/2575 398/67 |
| 2014/0213285 A1 * | 7/2014 | Sauer | H04W 64/00 455/456.1 |
| 2015/0037028 A1 | 2/2015 | Hsu et al. | |
| 2016/0087725 A1 | 3/2016 | Berlin et al. | |
| 2016/0134899 A1 * | 5/2016 | Petrisor | H04L 12/40182 725/76 |
| 2016/0315706 A1 * | 10/2016 | Yeo | H04B 10/25753 |
| 2017/0201322 A1 | 7/2017 | Harel et al. | |
| 2017/0339625 A1 | 11/2017 | Stapleton | |
| 2018/0176867 A1 * | 6/2018 | Yeo | H04B 17/327 |
| 2018/0219715 A1 | 8/2018 | Park | |
| 2018/0310226 A1 | 10/2018 | Kim et al. | |

OTHER PUBLICATIONS

Notice of Allowance issued in parent U.S. Appl. No. 15/848,172 dated Jan. 9, 2019.

* cited by examiner

HEADEND FOR DISTRIBUTED ANTENNA SYSTEM AND OPERATING METHOD THEREOF

CROSS-REFERENCE TO RELATED APPLICATIONS

This is a continuation of U.S. application Ser. No. 15/848,172, filed Dec. 20, 2017, which claims priority from Korean Patent Application No. 10-2016-0175922 filed Dec. 21, 2016 and Korean Patent Application No. 10-2016-0175937 filed on Dec. 21, 2016 in the Korean Intellectual Property Office, the disclosures of which are incorporated herein by reference in their entirety.

BACKGROUND

1. Field

One or more embodiments relate to a head-end device of a distributed antenna system and a method of operation thereof, and more particularly, to a head-end device of a distributed antenna system that can be implemented with a more efficient structure by using a serial transmission system in a head end, and a method of operating the head-end device.

2. Description of the Related Art

Due to the development of mobile communication, the usage of mobile communication by users is rapidly increasing, and the users want to be provided with a stable communication service without restriction of time and space. However, it is difficult for a service provider to provide a smooth communication service to users because a shadow area exists due to the limited output of the base station, the limitation of a location of a base station, and the surrounding terrain. To solve the problem, a distributed antenna system (DAS) is being used.

The DAS is installed in an area where radio waves are not received or where radio waves are weak, such as inside buildings, underground buildings, subways, tunnels, and apartment complexes in a residential area to extend a coverage of a base station by providing communication services to even a shadow area where signals of the base station are difficult to reach. The DAS includes a head-end device communicatively connected to the base station and at least one remote device connected to the head-end device through an optical transmission medium and communicatively connected to a user terminal.

SUMMARY

One or more embodiments include a head-end device of a distributed antenna system that can be implemented with a more efficient structure by using a serial transmission system in a head end, and a method of operating the head-end device.

According to one or more embodiments, a head-end device includes a plurality of base station interfacing units configured to interface each of transmission/reception signals that are exchanged between the head-end device and a plurality of base stations and a head-end control unit configured to receive an upper interfacing unit signal transmitted from an upper base station interfacing unit from among the plurality of base station interfacing units, and sequentially transmit the received upper interfacing unit signal to a lower base station interfacing unit.

According to an example embodiment, the plurality of base station interfacing units are connected to each other in a cascade structure through the head-end control unit.

According to an example embodiment, each of the plurality of base station interfacing units comprises: a combiner configured to, in downlink communication, combine the upper interfacing unit signal transmitted from the upper base station interfacing unit through the head-end control unit with a downlink signal directly received by the lower base station interfacing unit.

According to an example embodiment, a lowermost base station interfacing unit from among the plurality of base station interfacing units is configured to transmit serial downlink signals, in which all of downlink signals received by each of the plurality of base station interfacing units are combined, to a head-end optical transceiving unit through the head-end control unit.

According to an example embodiment, the head-end device is a main head-end device, and the combiner of an uppermost base station interfacing unit from among the plurality of base station interfacing units is configured to combine a downlink signal transmitted from a sub head-end device with a downlink signal directly received by the uppermost base station interfacing unit and output the combined signal.

According to an example embodiment, each of the plurality of base station interfacing units, in uplink communication, is configured to separate and output an uplink signal with respect to a corresponding base station interfacing unit from the received upper interfacing unit signal, and transmit the remaining uplink signal to a lower base station interfacing unit.

According to an example embodiment, an uppermost base station interfacing unit from among the plurality of base station interfacing units is configured to receive serial uplink signals transmitted from a head-end optical transceiving unit.

According to an example embodiment, the head-end device is a main head-end device, and a lowermost base station interfacing unit from among the plurality of base station interfacing units is configured to transmit the remaining uplink signal to a sub head-end device.

According to one or more embodiments, a method of operating a head-end device comprising: receiving an upper base station interfacing unit signal transmitted from an upper base station interfacing unit through a head-end control unit, combining the upper base station interfacing unit signal with a downlink signal directly received by a corresponding base station interfacing unit, and transmitting the combined signal to a lower base station interfacing unit through the head-end control unit.

According to one or more embodiments, a method of operating a head-end device comprising: receiving an upper base station interfacing unit signal transmitted from an upper base station interfacing unit through a head-end control unit, distributing the upper base station interfacing unit signal to an uplink signal with respect to a corresponding base station interfacing unit and the remaining uplink signal, and transmitting the distributed remaining uplink signal to a lower base station interfacing unit.

According to one or more example embodiments, the head-end device includes a head-end control unit that receives serial downlink signal transmitted from any one of a plurality of base station interfacing units, and a plurality of head-end optical transceiving units that receive the serial downlink signal output from the head-end control unit, distribute the received serial downlink signal, and transmit the serial downlink signal in parallel to a remote device or an extension device, wherein one of the plurality of head-end optical transceiving units receives the serial downlink signal and sequentially distributes the serial downlink signal to the remaining head-end optical transceiving units.

According to an example embodiment, the one of the plurality of head-end optical transceiving units may be an uppermost head-end optical transceiving unit from among the plurality of head-end optical transceiving units.

According to an example embodiment, each of the plurality of head-end optical transceiving units may include a distributor that distributes an upper head-end optical transceiving unit signal transmitted from an upper head-end optical transceiving unit from among the plurality of head-end optical transceiving units to a signal to be transmitted to the remote device or the extension device and a signal to be transmitted to a lower head-end optical transceiving unit.

According to an example embodiment, each of the plurality of head-end optical transceiving units may include a plurality of sub head-end optical transceiving units, and one of the plurality of sub head-end optical transceiving units may receive the serial downlink signal and distribute the same to the remaining sub head-end optical transceiving unit.

According to one or more example embodiments, the head-end device includes a plurality of head-end optical transceiving units that sequentially combine uplink signals received in parallel from each of remote devices or extension devices and output combined serial uplink signal, and a head-end control unit that receives the serial uplink signal transmitted from one of the plurality of head-end optical transceiving units and transmits the received serial uplink signal to one of a plurality of base station interfacing units.

According to an example embodiment, the one of the plurality of head-end optical transceiving units may be a lowermost head-end optical transceiving unit from among the plurality of head-end optical transceiving units.

According to an example embodiment, each of the plurality of head-end optical transceiving units may include a combiner that combines an upper head-end optical transceiving unit signal transmitted from an upper head-end optical transceiving unit from among the plurality of head-end optical transceiving units and an uplink signal directly received by a corresponding head-end optical transceiving unit.

According to an example embodiment, each of the plurality of head-end optical transceiving units may include a plurality of sub head-end optical transceiving units, and a lower sub head-end optical transceiving unit from among the plurality of sub head-end optical transceiving units may combine a signal transmitted from an upper sub head-end optical transceiving unit and an uplink signal directly received by the lower sub head-end optical transceiving unit and output the same.

According to one or more example embodiments, a method of operating a head-end device includes transmitting serial downlink signal, in which all of downlink signals received by each of a plurality of base station interfacing units are combined, to any one of a plurality of head-end optical transceiving units through a head-end control unit, receiving the serial downlink signal through the any one of the plurality of head-end optical transceiving units, and sequentially distributing the received serial downlink signal and transmitting the distributed serial downlink signals in parallel to a remote device or an extension device.

According to one or more example embodiments, a method of operating a head-end device includes receiving uplink signals transmitted in parallel from each of remote devices or extension devices, sequentially combining the received uplink signals, and transmitting the combined serial uplink signal to any one of a plurality of base station interfacing units through a head-end control unit.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
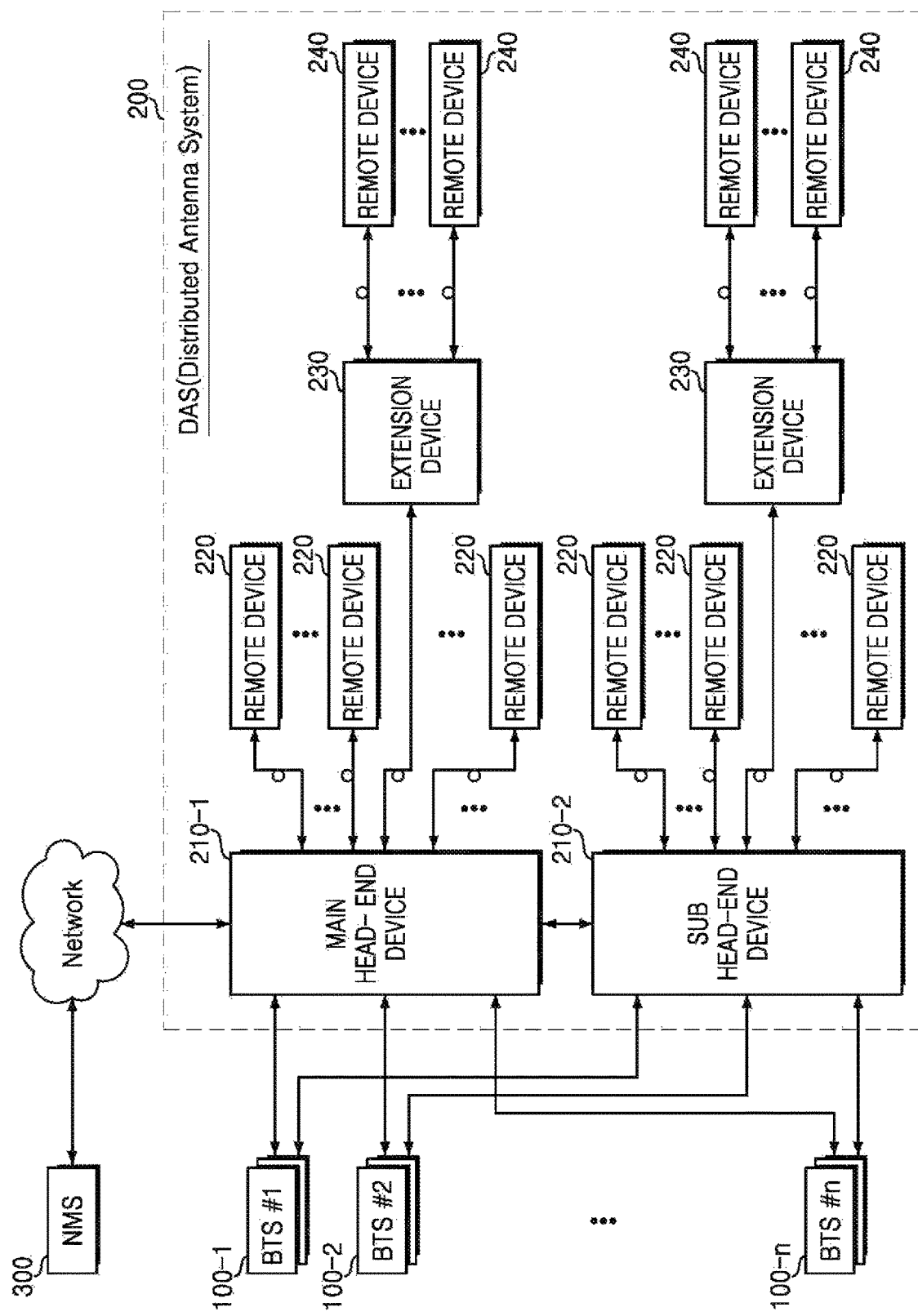
FIG. 1 is a block diagram of a distributed antenna system according to an embodiment.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

The distributed antenna system according to an embodiment of the inventive concept improves a poor propagation environment in a building, improves a poor received signal strength indication (RSSI) and the overall reception sensitivity of a mobile terminal, chip energy/other interferences (Ec/Io), and provides a mobile communication service to every corner of the building so that a user of the mobile communication service can freely talk anywhere in the building.

The distributed antenna system according to an embodiment of the inventive concept may support the mobile communication standard used worldwide. For example, the distributed antenna system may support a time division duplex (TDD) service as well as a frequency division duplex (FDD) service, a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the distributed antenna system may support a number of mobile communication standards such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), and so on.

Hereinafter, embodiments of the inventive concept will be described in detail in turn.

FIG. 1 is a block diagram of a distributed antenna system (DAS) 200 according to an embodiment.

Referring to FIG. 1, the DAS 200 may include head-end devices 210-1 and 210-2 that constitute a head-end node and are communicatively connected to a plurality of base transceiver stations BTS 100-1 to 100-*n*, a plurality of remote devices 220 that constitute a remote node and are communicatively connected to a user terminal by being arranged at each remote service location, and extension devices 230 that constitute an extension node, and a plurality of remote devices 240 connected to each of the extension devices 230. The DAS 200 may be implemented as an analog DAS. However, the inventive concept is not limited thereto. According to an embodiment, the DAS 200 may be implemented as a digital DAS, and in some cases may be implemented as a mixed form thereof (e.g., some nodes perform analog processing and the other nodes perform digital processing). Hereinafter, a case where the DAS 200 is implemented as an analog DAS will be described as an example.

Meanwhile, FIG. 1 shows an example of a topology of the DAS 200 and various variations are possible in the DAS 200 considering specificity of installation areas and application fields (e.g., in-building, a subway, a hospital, a stadium, etc.). That is, the number of the head-end devices 210-1 and 210-2, the extension devices 230, and the remote devices 220 and 240, and a connection relationship between upper and lower ends thereof may be different from those of FIG. 1. For example, at least one extension device or remote device may be connected to a lower end of any one of the remote devices 220 directly connected to the head-end devices 210-1 and 210-2 or any one of the remote devices 240 directly connected to the extension devices 230.

Also, the extension device 230 in the DAS 200 may be utilized when the number of branches of the head-end devices 210-1 and 210-2 is limited compared to the number of remote devices to be installed.

Each node in the DAS 200 and its function will be described in more detail. First, the head-end devices 210-1 and 210-2 may serve as an interface with a base station. FIG. 1 shows that each of the head-end devices 210-1 and 210-2 is connected to first BTS BTS #1 to $n^{th}$ BTS BTS # n (where n is a natural number of 2 or more). According to an embodiment, each of the head-end devices 210-1 and 210-2 may be connected to a base station for each service frequency band of a specific service provider or a base station for each sector. According to another embodiment, the main head-end device 210-1 may compensate for coverage by the sub head-end device 210-2.

In general, since a radio frequency (RF) signal transmitted from a base station is a high-power signal, the head-end devices 210-1 and 210-2 may attenuate such a high-power RF signal into a signal of power suitable for processing at each node. The head-end devices 210-1 and 210-2 may lower a high-power RF signal for each frequency band or for each sector to a low-power RF signal. The head-end devices 210-1 and 210-2 may combine the low-power RF signals and may distribute the combined signal to the extension device 230*a* or the remote device 220*a*.

The extension device 230 may transmit the distributed combined signal to the remote device 240 connected to the extension device 230.

Each of the remote devices 220 and 240 may separate the received combined signal for each frequency band and perform signal processing such as amplification. Accordingly, each of the remote devices 220 and 240 may transmit a base station signal to a user terminal in its service coverage through a service antenna (not shown).

Although FIG. 1 shows that the plurality of BTS 100-1 to 100-*n* and the head-end devices 210-1 and 210-2 are connected to each other through an RF cable, and the head-end devices 210-1 and 210-2 and a lower end of the head-end devices 210-1 and 210-2 are connected to each other through an optical cable, a signal transport medium between nodes may vary.

For example, at least one of between the head-end devices 210-1 and 210-2 and the extension device 230, between the head-end devices 210-1 and 210-2 and the remote device 220, between the extension device 230 and the remote device 240 may be connected through an RF cable, a twisted cable, a UTP cable or the like in addition to the optical cable.

However, the following description will be made with reference to FIG. 1. Therefore, in the DAS 200, the head-end devices 210-1 and 210-2, the extension device 230, and the remote devices 220 and 240 may include an optical transceiver module for transmitting and receiving optical signals through electro-optical conversion/photoelectric conversion, and may further include a wavelength division multiplexing (WDM) device when nodes are connected to each other by a single optical cable.

The DAS 200 may be connected to an external management device (not shown) such as a network management server or a network management system (NMS) 300 or a network operation center (NOC) (not shown) via a network. Accordingly, an administrator may remotely monitor the status and problem of each node of the DAS 200, and may remotely control the operation of each node.

Figure 2:
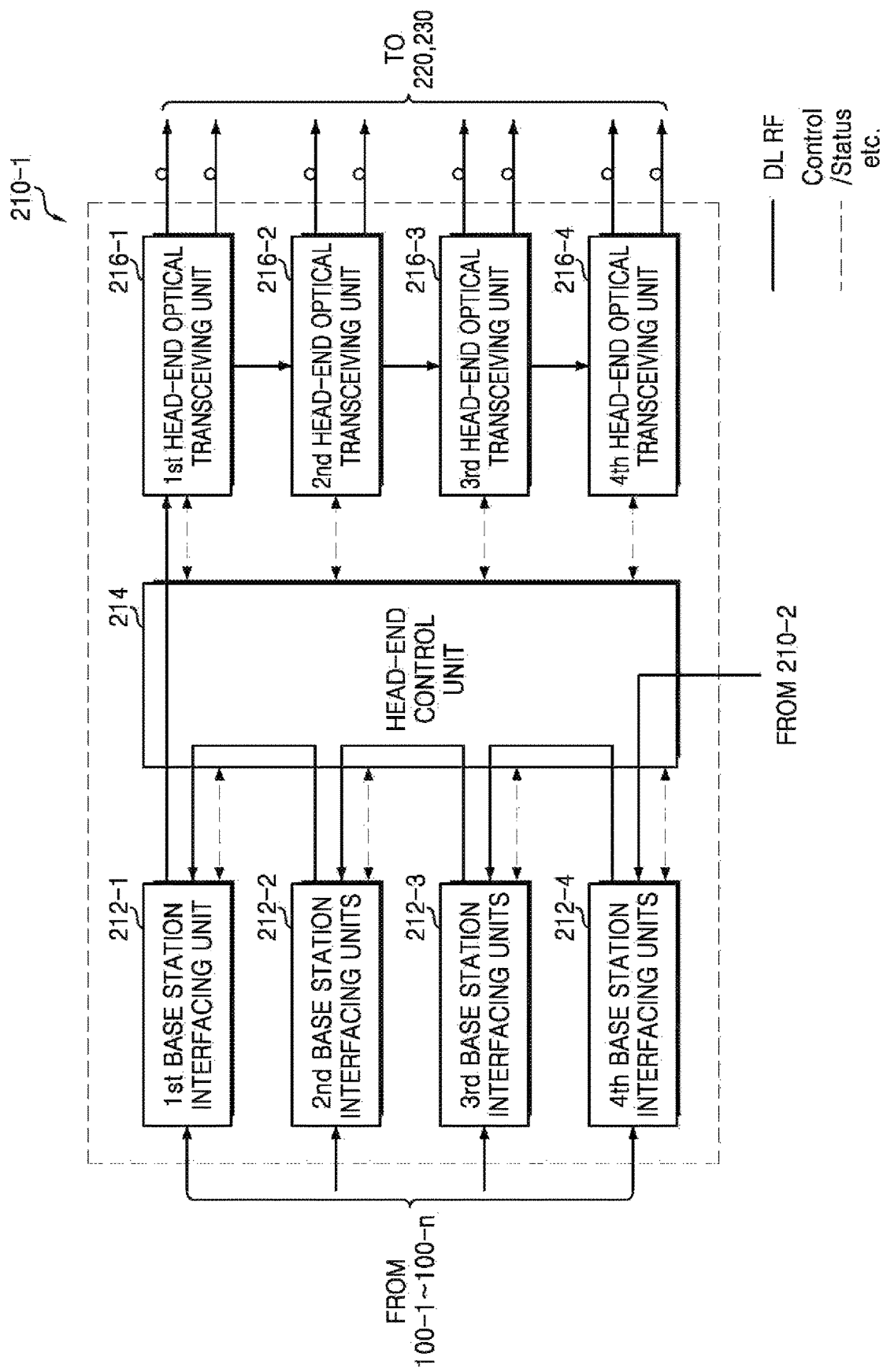
FIG. 2 is a view of a signal processing path of a main head-end device in downlink communication in FIG. 1.
Figure 3:
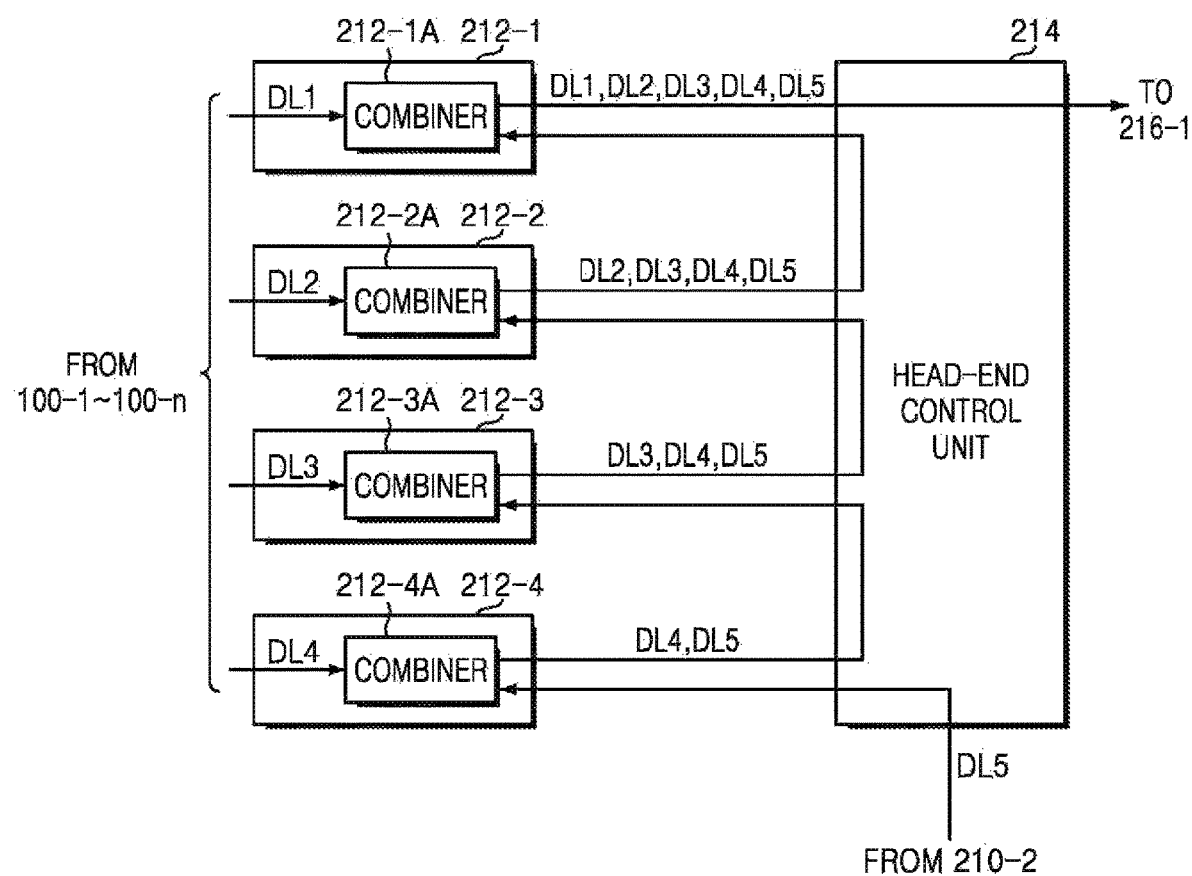
FIG. 3 is a view of a detailed signal processing path between a plurality of base station interfacing units and a head-end control unit in FIG. 2.
Figure 4:
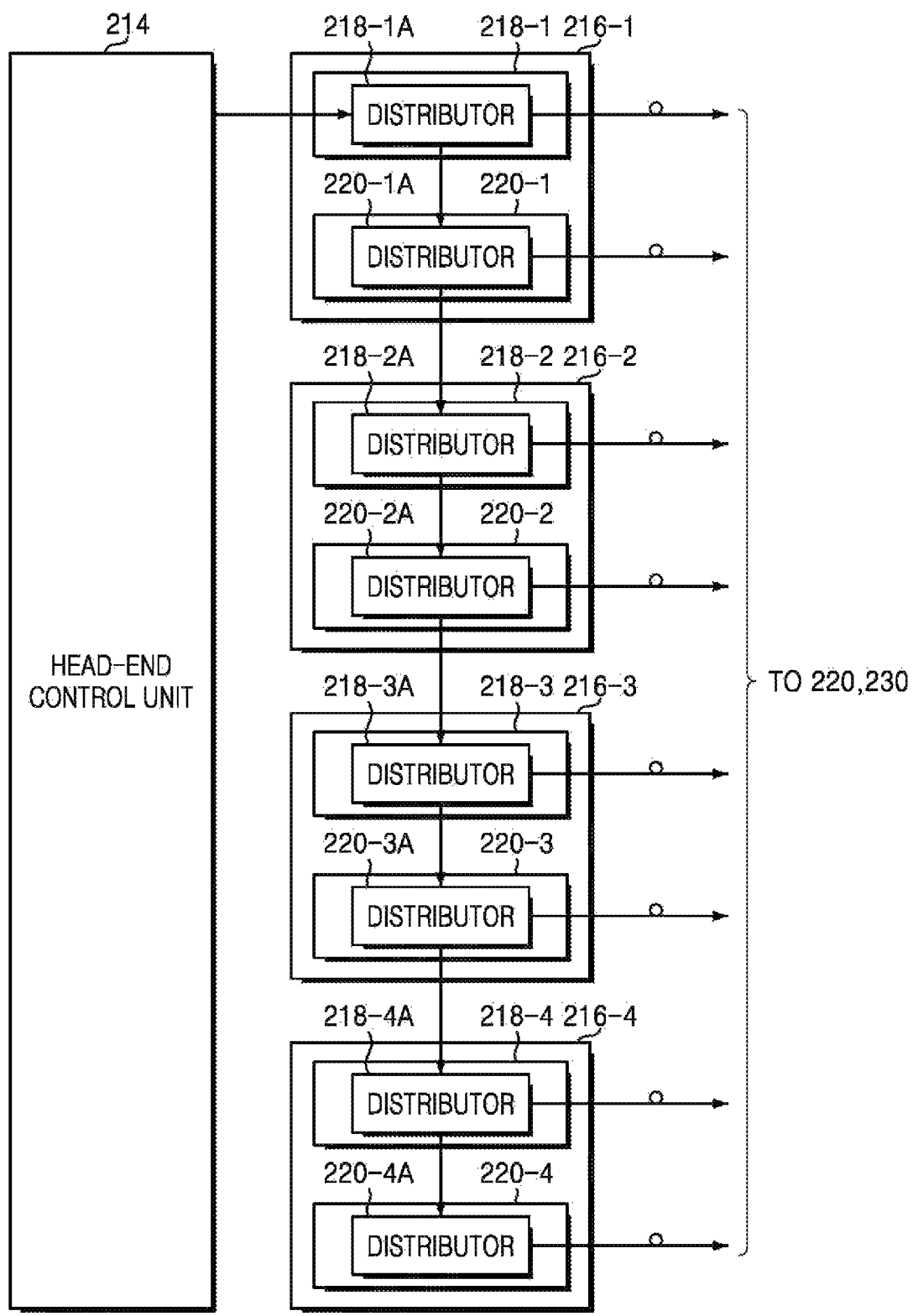
FIG. 4 is a view of a detailed signal processing path between a head-end control unit and a plurality of head-end optical transceiving units in FIG. 2.

FIG. 2 is a view of a signal processing path of the main head-end device 210-1 in downlink communication in FIG. 1. FIG. 3 is a view of a detailed signal processing path between a plurality of base station interfacing units 212-1 to 212-4 and a head-end control unit 214 in FIG. 2. FIG. 4 is a view of a detailed signal processing path between the head-end control unit 214 and a plurality of head-end optical transceiving units 216-1 to 216-4 in FIG. 2.

Referring to FIGS. 1 and 2, the main head-end device 210-1 may include the plurality of base station interfacing units 212-1 to 212-4, the head-end control unit 214, and the plurality of head-end optical transceiving units 216-1 to 216-4.

Although FIGS. 2 to 4 show a case where the main head-end device 210-1 includes four interfacing units and four head-end optical transceiving units for convenience of description, but the inventive concept is not limited thereto. The number of interfacing units and head-end optical transceiving units may vary.

Furthermore, FIGS. 2 to 4 mainly describe a configuration used for a downlink communication process for convenience of description, and a configuration used for an uplink communication process is omitted.

Each of the plurality of base station interfacing units 212-1 to 212-4 receives base station signals transmitted in parallel from each of the plurality of BTS 100-1 to 100-$n$ in downlink communication. Each of the plurality of base station interfacing units 212-1 to 212-4 may interface the received base station signals with a signal suitable for processing at each node at a rear end of the plurality of base station interfacing units 212-1 to 212-4. For example, each of the plurality of base station interfacing units 212-1 to 212-4 may attenuate and output the received base station signals.

According to an embodiment, each of the plurality of base station interfacing units 212-1 to 212-4 may interface signals of different frequency bands.

The head-end control unit 214 may monitor a operation status of each of the components 212-1 to 212-4 and 216-1 to 216-4 in the main head-end device 210-1, or may control general operations of each of the components 212-1 to 212-4 and 216-1 to 216-4 in the main head-end device 210-1.

The head-end control unit 214 may receive an upper interfacing unit signal transmitted from an upper base station interfacing unit (e.g., the fourth base station interfacing unit 212-4) from among the plurality of base station interfacing units 212-1 to 212-4, and may sequentially transmit the received upper interfacing unit signal to a lower base station interfacing unit (e.g., the third base station interfacing unit 212-3).

Herein, the term "upper base station interfacing unit" refers to a base station interfacing unit located relatively ahead on a signal path of downlink communication or uplink communication, and the term "lower base station interfacing unit" may refer to a base station interfacing unit located relatively behind on a signal path of downlink communication or uplink communication.

That is, since a signal path of the downlink communication is different from that of the uplink communication, the "upper base station interfacing unit" in the downlink communication and "upper base station interfacing unit" in the uplink communication may different. Likewise, the "lower base station interfacing unit" in the downlink communication and the "lower base station interfacing unit" in the uplink communication may different.

Referring to FIGS. 2 and 3, each of the plurality of base station interfacing units 212-1 to 212-4 may include combiners 212-1A to 212-4A for combining signals.

The fourth base station interfacing unit 212-4 is a frontmost base station interfacing unit, that is, an uppermost base station interfacing unit, in which a downlink signal is input to the main head-end device 210-1 in downlink communication.

A fifth downlink signal DL5 input from the sub head-end device 210-2 may be input to the fourth base station interfacing unit 212-4 through the head-end control unit 214.

The combiner 212-4A of the fourth base station interfacing unit 212-4 may combine a fifth downlink signal DL5 transmitted from the sub head-end device 210-2 through the head-end control unit 214 and a base station signal DL4 directly received by the fourth base station interfacing unit 212-4, and may output the combined signal DL4 and DL5. The downlink signals output from the fourth base station interfacing unit 212-4, that is, the upper interfacing unit signal DL4 and DL5 may be transmitted to the third base station interfacing unit 212-3 through the head-end control unit 214.

The term "upper interfacing unit signal" herein may broadly refer to a signal transmitted from a relatively higher interfacing unit than the corresponding interfacing unit. And the upper interfacing unit signal DL4 and DL5 may refer a combined signal which is combination of a fourth downlink signal DL4 and a fifth downlink signal DL5.

The third base station interfacing unit 212-3 may receive the upper interfacing unit signal DL4 and DL5 transmitted from an upper head-end control unit, for example, the fourth base station interfacing unit 212-4 through the head-end control unit 214. The combiner 212-3A of the third base station interfacing unit 212-3 may combine the received upper interfacing unit signal DL4 and DL5 and a base station signal DL3 directly received by the third base station interfacing unit 212-3, and may output the combined signal DL3, DL4, and DL5.

In the same manner, the second base station interfacing unit 212-2 may combine a downlink signal DL2 directly received by the second base station interfacing unit 212-2 to the upper interfacing unit signal DL3, DL4, and DL5, and may transmit the combined signal DL2, DL3, DL4, and DL5 to the first base station interfacing unit 212-1, which is a lowermost base station interfacing unit, through the head-end control unit 214.

In downlink communication, the first base station interfacing unit 212-1, which is a lowermost base station interfacing unit, may transmit serial downlink signal, in which all of the downlink signals DL1, DL2, DL3, and DL4 received by each of the plurality of base station interfacing units 212-1 to 212-4 are combined, to the first head-end optical transceiving unit 216-1 through the head-end control unit 214.

According to the embodiment, when there is the downlink signal DL5 input from the sub head-end device 210-2, the first base station interfacing unit 212-1 may transmit serial downlink signal DL1, DL2, DL3, DL4, and DL5, in which the downlink signals DL1, DL2, DL3, and DL4 received by each of the plurality of base station interfacing units 212-1 to 212-4 and the downlink signal DL5 input from the sub head-end device 210-2 are combined, to the first head-end optical transceiving unit 216-1 through the head-end control unit 214.

Referring again to FIG. 2, any one of the head-end optical transceiving units 216-2 to 216-4, for example, the first head-end optical transceiving unit 216-1, may receive serial downlink signal transmitted from the first base station interfacing unit 212-1 and sequentially distribute the serial downlink signal to the remaining head-end optical transceiving units, for example, the second to fourth head-end optical transceiving units 216-2 to 216-4. Each of the plurality of head-end optical transceiving units 216-1 to 216-4 may transmit in parallel the distributed serial downlink signals to the remote device 220 or the extension device 230.

According to an embodiment, a head-end optical transceiving unit receiving serial downlink signals in downlink communication may be an uppermost head-end optical transceiving unit from among a plurality of head-end optical transceiving units, for example, the first head-end optical transceiving unit 216-1.

Referring to FIGS. 2 and 4, each of the plurality of head-end optical transceiving units 216-1 to 216-4 may include a plurality of sub head-end optical transceiving units 218-1 to 218-4 and 220-1 to 220-4.

Furthermore, each of the plurality of sub head-end optical transceiving units 218-1 to 218-4 and 220-1 to 220-4 may include distributors 218-1A to 218-4A and 220-1A to 220-4A.

The first sub head-end optical transceiving unit 218-1 of the first head-end optical transceiving unit 216-1 receiving serial downlink signal may distribute the serial downlink signals in two, and may transmit one signal to the remote device 220 or extension device 230, and the other signal to the second sub head-end optical transceiving unit 220-1.

The second sub head-end optical transceiving unit 220-1 of the first head-end optical transceiving unit 216-1 may distribute the signals received from the first sub head-end optical transceiving unit 218-1 again in two, and may transmit one signal to the remote device 220 or extension device 230, and the other signal to the second head-end optical transceiving unit 216-2.

In the same manner, each of the plurality of head-end optical transceiving units 216-1 to 216-4 may sequentially distribute an upper head end optical transceiving unit signal transmitted from an upper head-end optical transceiving unit from among the plurality of head-end optical transceiving units 216-1 to 216-4 to a signal to be transmitted to the remote device 220 or the extension device 230 and a signal to be transmitted to a lower head-end optical transceiving unit from among the plurality of head-end optical transceiving units 216-1 to 216-4.

According to an embodiment, a relationship between an upper head-end optical transceiving unit and a lower head-end optical transceiving unit may be directly applied to a relationship between an upper sub head-end optical transceiving unit and a lower sub head-end optical transceiving unit. For example, any one of the plurality of sub head-end optical transceiving units (e.g., 218-1 and 220-1), for example, the first sub head-end optical transceiving unit 218-1, may receive serial downlink signal and sequentially distribute the serial downlink signals to the remaining sub head-end optical transceiving unit, for example, the second sub head-end optical transceiving unit 220-1.

Figure 5:
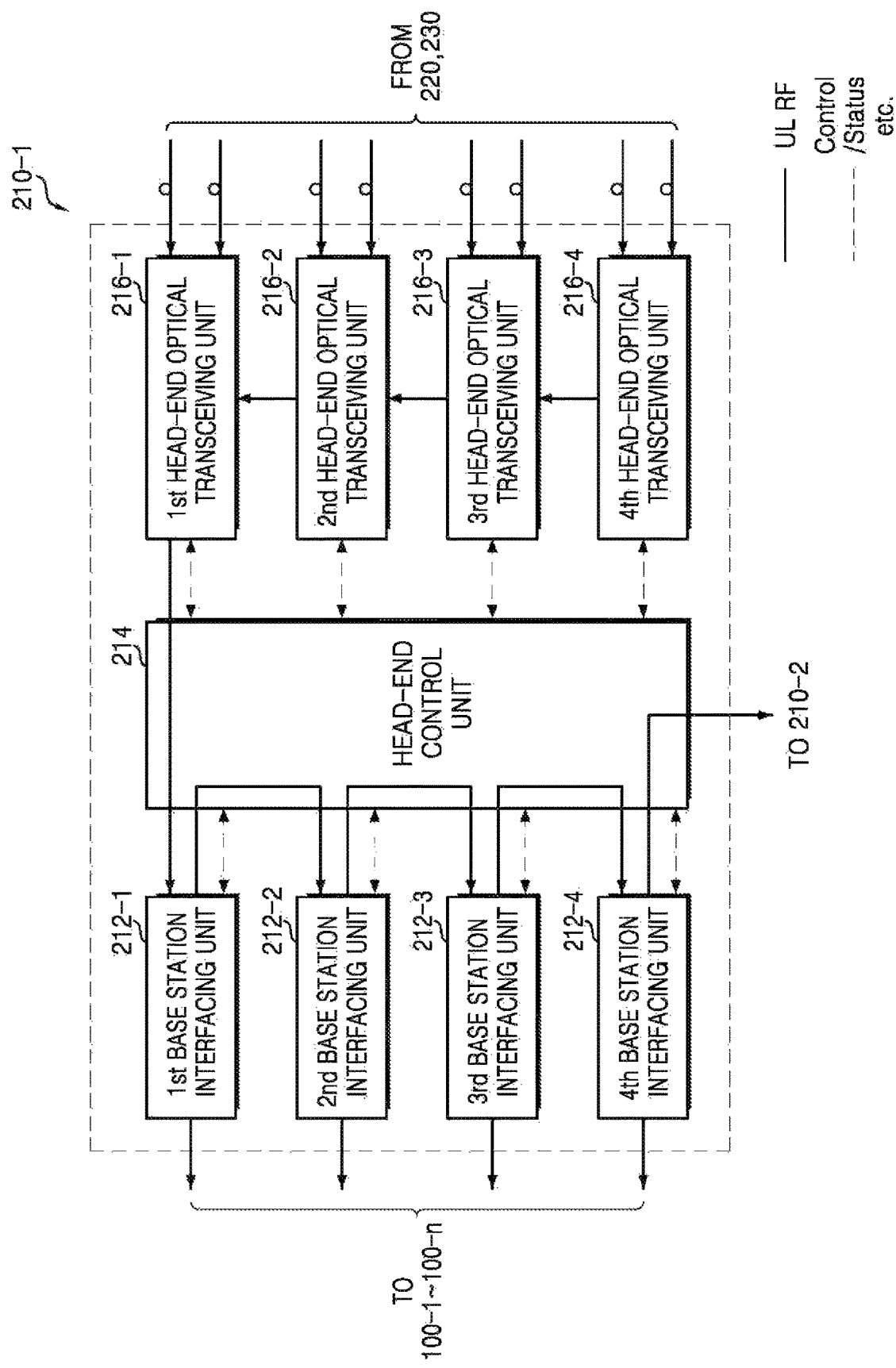
FIG. 5 is a view of a signal processing path of a main head-end device in uplink communication in FIG. 1.
Figure 6:
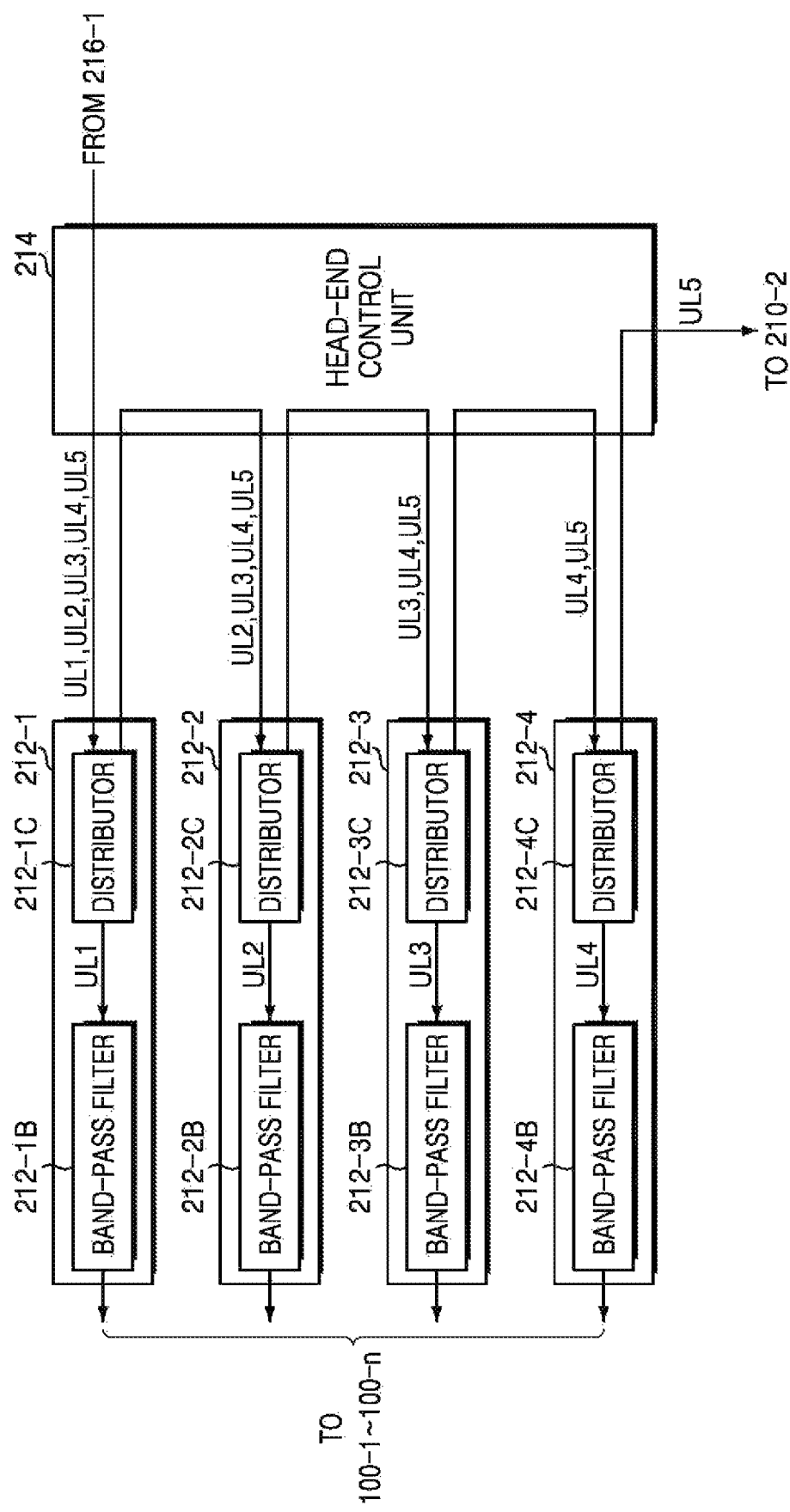
FIG. 6 is a view of a detailed signal processing path between a plurality of base station interfacing units and a head-end control unit in FIG. 5.
Figure 7:
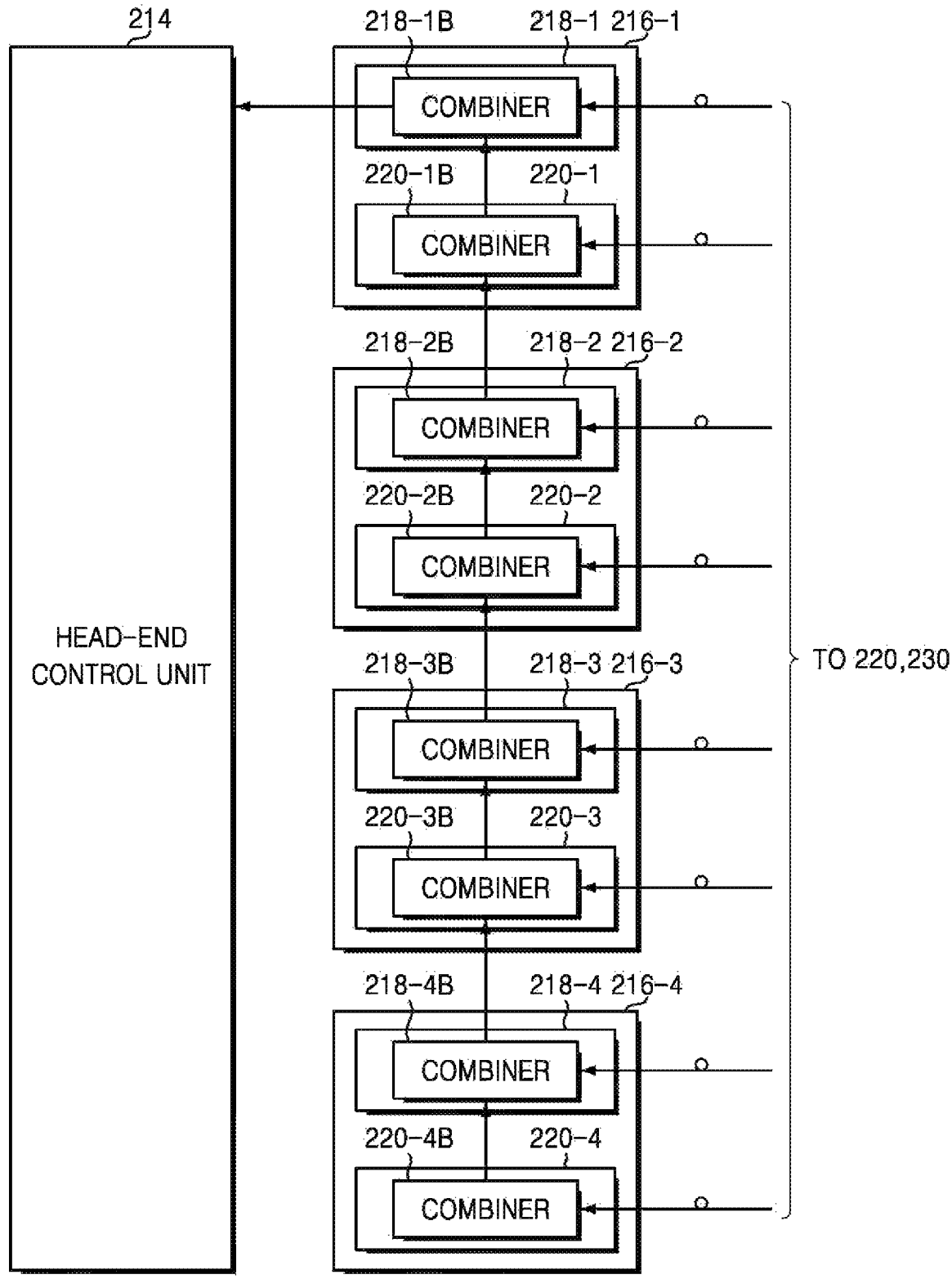
FIG. 7 is a view of a detailed signal processing path between a head-end control unit and a plurality of head-end optical transceiving units in FIG. 5.

FIG. 5 is a view of a signal processing path of the main head-end device 210-1 in uplink communication in FIG. 1. FIG. 6 is a view of a detailed signal processing path between a plurality of base station interfacing units and a head-end control unit in FIG. 5. FIG. 7 is a view of a detailed signal processing path between a head-end control unit and a plurality of head-end optical transceiving units in FIG. 5.

Although FIGS. 5 to 7 show a case where the main head-end device 210-1 includes four interfacing units and four head-end optical transceiving units for convenience of description, but the inventive concept is not limited thereto. The number of interfacing units and head-end optical transceiving units may vary.

Furthermore, FIGS. 5 to 7 mainly describe a configuration used for an uplink communication process for convenience of description, and a configuration used for a downlink communication process is omitted.

In uplink communication, an uppermost base station interfacing unit, for example, the first base station interfacing unit 212-1, from among the plurality of base station interfacing units 212-1 to 212-4 may receive serial uplink signal transmitted from the first head-end optical transceiving unit 216-1 through the head-end control unit 214.

Each of the plurality of base station interfacing units 212-1 to 212-4 may distribute an upper interfacing unit signal to an uplink signal with respect to a corresponding base station interfacing unit and the remaining uplink signals.

Referring to FIGS. 5 and 6, each of the plurality of base station interfacing units 212-1 to 212-4 may include band-pass filters 212-1B to 212-4B and distributors 212-1C to 212-4C for distributing signals.

The first base station interfacing unit 212-1 is a frontmost base station interfacing unit, that is, an uppermost base station interfacing unit, to which serial uplink signal is input in uplink communication.

Serial uplink signal UL1, UL2, UL3, UL4, and UL5 transmitted from the first head-end optical transceiving unit 216-1 may be input to the first base station interfacing unit 212-1.

The distributor 212-1C of the first base station interfacing unit 212-1 may distribute the received serial uplink signal UL1, UL2, UL3, UL4, and UL5 to the uplink signal UL1 corresponding to the first base station interfacing unit 212-1 and the remaining uplink signal UL2, UL3, UL4, and UL5. According to an embodiment, the remaining uplink signal UL2, UL3, UL4, and UL5 may be a serial signal. The first uplink signal UL1 distributed by the distributor 212-1C may be transmitted to at least one of the plurality of BTS 100-1 to 100-n through the band-pass filter 212-1B. The remaining uplink signal UL2, UL3, UL4, and UL5 distributed by the distributor 212-1C may be transmitted to the second base station interfacing unit 212-2, which is a lower base station interfacing unit of the first base station interfacing unit 212-1, through the head end control unit 214.

The second base station interfacing unit 212-2 may receive upper interfacing unit signal (that is, the remaining uplink signal UL2, UL3, UL4, and UL5) from the first base station interfacing unit 212-1, which is an upper base station interfacing unit, through the head end control unit 214.

The distributor 212-2C of the second base station interfacing unit 212-2 may distribute the received upper interfacing unit signal UL2, UL3, UL4, and UL5 to the uplink signal UL2 corresponding to the second base station interfacing unit 212-2 and the remaining uplink signal UL3, UL4, and UL5. According to an embodiment, the remaining uplink signal UL3, UL4, and UL5 may be a serial signal. The second uplink signal UL2 distributed by the distributor 212-2C may be transmitted to at least one of the plurality of BTS 100-1 to 100-n through the band-pass filter 212-2B.

In the same manner, the third base station interfacing unit 212-3 and the fourth base station interfacing unit 212-4 also distribute an upper base station interfacing unit signal to an uplink signal with respect to a corresponding base station interfacing unit and the remaining uplink signal, and may transmit the remaining uplink signal to a lower base station interfacing unit through the head-end control unit 214.

According to an embodiment, the distributor 212-4C of the fourth base station interfacing unit 212-4 may transmit the remaining uplink signal UL5 to the sub-head end device 210-2 through the head-end control unit 214.

Referring again to 5, each of the plurality of head-end optical transceiving units 216-1 to 216-4 may sequentially combine uplink signals received in parallel from the remote device 220 or the extension device 230. The combined serial uplink signal may be output from the first head-end optical transceiving unit 216-1 which is a lowermost head-end optical transceiving unit of the plurality of head-end optical transceiving units 216-1 to 216-4.

Referring to FIGS. 5 and 7, each of the plurality of head-end optical transceiving units 216-1 to 216-4 may include the plurality of sub head-end optical transceiving units 218-1 to 218-4 and 220-1 to 220-4.

Furthermore, each of the plurality of sub head-end optical transceiving units 218-1 to 218-4 and 220-1 to 220-4 may include combiners 218-1B to 218-4B and 220-1B to 220-4B.

Each of the plurality of sub head-end optical transceiving units 218-1 to 218-4 and 220-1 to 220-4 may receive uplink signals transmitted in parallel from the remote devices 220 or the extension devices 230.

Each of the plurality of sub head-end optical transceiving units 218-1 to 218-4 and 220-1 to 220-4 may sequentially combine the uplink signals received in parallel with from the second sub head-end optical transceiving unit 220-4 of the fourth head-end optical transceiving unit 216-4 which is an uppermost head-end optical transceiving unit to the first sub head-end optical transceiving unit 218-1 of the first head-end optical transceiving unit 216-1 which is a lowermost head-end optical transceiving unit.

The combined serial uplink signal may be transmitted to the head-end control unit 214 by the first head-end optical transceiving unit 216-1 which is a lowermost head-end optical transceiving unit. In particular, the combined serial uplink signal may be transmitted to the head-end control unit 214 by the first sub head-end optical transceiving unit 218-1 of the first head-end optical transceiving unit 216-1 which is a lowermost head-end optical transceiving unit.

Figure 8:
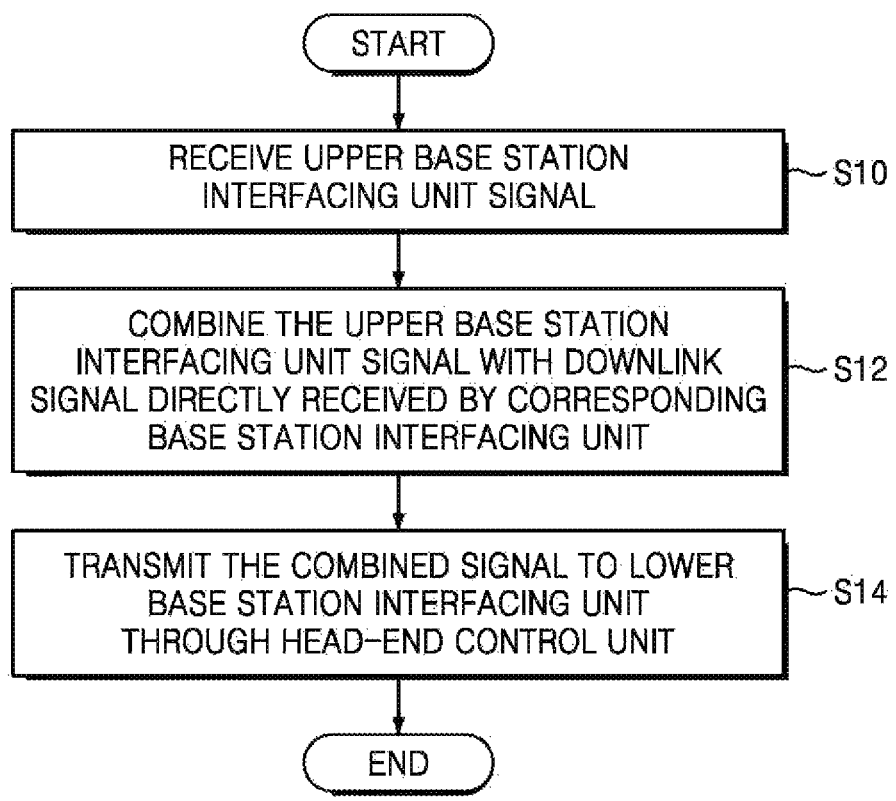
FIG. 8 is a flowchart of a method of operating the distributed antenna system in downlink communication in FIG. 1.

FIG. 8 is a flowchart of a method of operating the DAS 200 in downlink communication in FIG. 1.

Referring to FIGS. 1 to 4 and 8, in operation S10, each of the plurality of base station interfacing units 212-1 to 212-4 may receive an upper base station interfacing unit signal transmitted from an upper base station interfacing unit.

For example, the third base station interfacing unit 212-3 may receive upper base station interfacing unit signal DL4 and DL5 from the fourth base station interfacing unit 212-4 which is an upper base station interfacing unit.

In operation S12, each of the plurality of base station interfacing units 212-1 to 212-4 may combine an upper base station interfacing unit signal with a downlink signal directly received by a corresponding base station interfacing unit.

For example, the third base station interfacing unit 212-3 may combine the upper base station interfacing unit signal DL4 and DL5 with the downlink signal DL3 directly received by a corresponding base station interfacing unit, that is, the third base station interfacing unit 212-3.

In operation S14, each of the plurality of base station interfacing units 212-1 to 212-4 may transmit the combined signal to a lower base station interfacing unit through the head-end control unit 214.

For example, the third base station interfacing unit 212-3 may transmit the combined signal DL3, DL4, and DL5 to a lower base station interfacing unit, that is, the second base station interfacing unit 212-2, through the head-end control unit 214.

Figure 9:
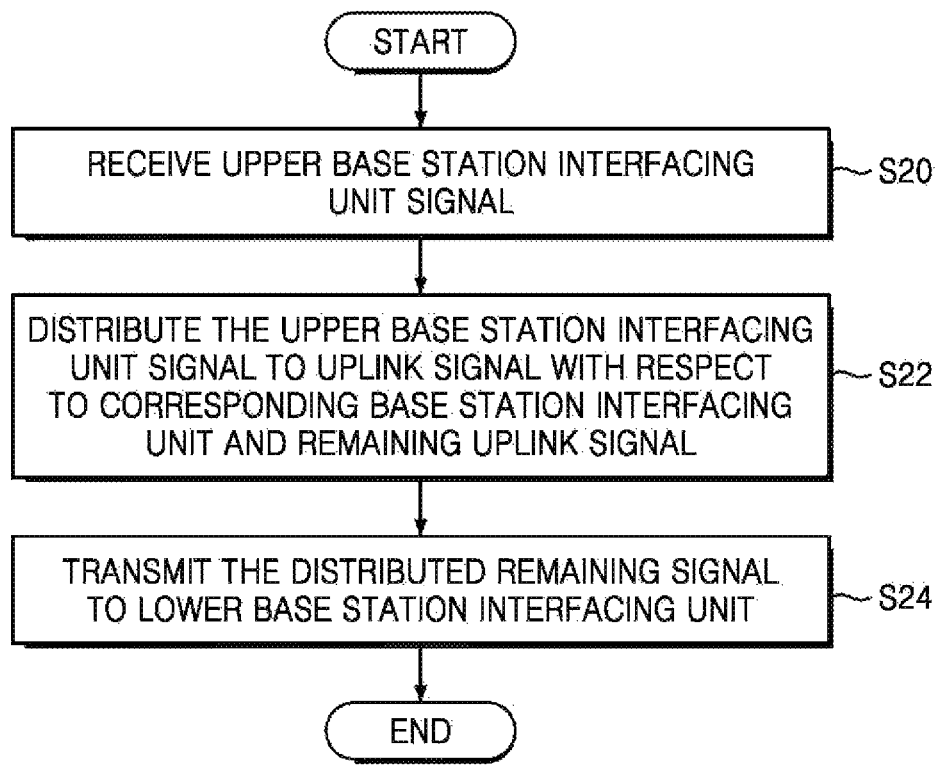
FIG. 9 is a flowchart of a method of operating the distributed antenna system in uplink communication in FIG. 1.

FIG. 9 is a flowchart of a method of operating the DAS 200 in uplink communication in FIG. 1.

Referring to FIGS. 1, 5 to 7 and 8, in operation S20, each of the plurality of base station interfacing units 212-1 to 212-4 may receive an upper base station interfacing unit signal.

For example, the third base station interfacing unit 212-3 may receive upper base station interfacing unit signal UL3, UL4, and UL5 ? from the second base station interfacing unit 212-2 which is an upper base station interfacing unit.

In operation S22, each of the plurality of base station interfacing units 212-1 to 212-4 may distribute an upper base station interfacing unit signal to an uplink signal with respect to a corresponding base station interfacing unit and the remaining uplink signal.

For example, the third base station interfacing unit 212-3 may distribute the upper base station interfacing unit signal UL3, UL4, and UL5 to the uplink signal UL3 with respect to a corresponding base station interfacing unit, that is, the third base station interfacing unit 212-3, and the remaining uplink signal UL4 and UL5.

In operation S24, each of the plurality of base station interfacing units 212-1 to 212-4 may transmit the distributed remaining signal to a lower base station interfacing unit through the head-end control unit 214.

For example, the third base station interfacing unit 212-3 may transmit the distributed remaining uplink signal UL4 and UL5 to a lower base station interfacing unit, that is, the fourth base station interfacing unit 212-4, through the head-end control unit 214.

Figure 10:
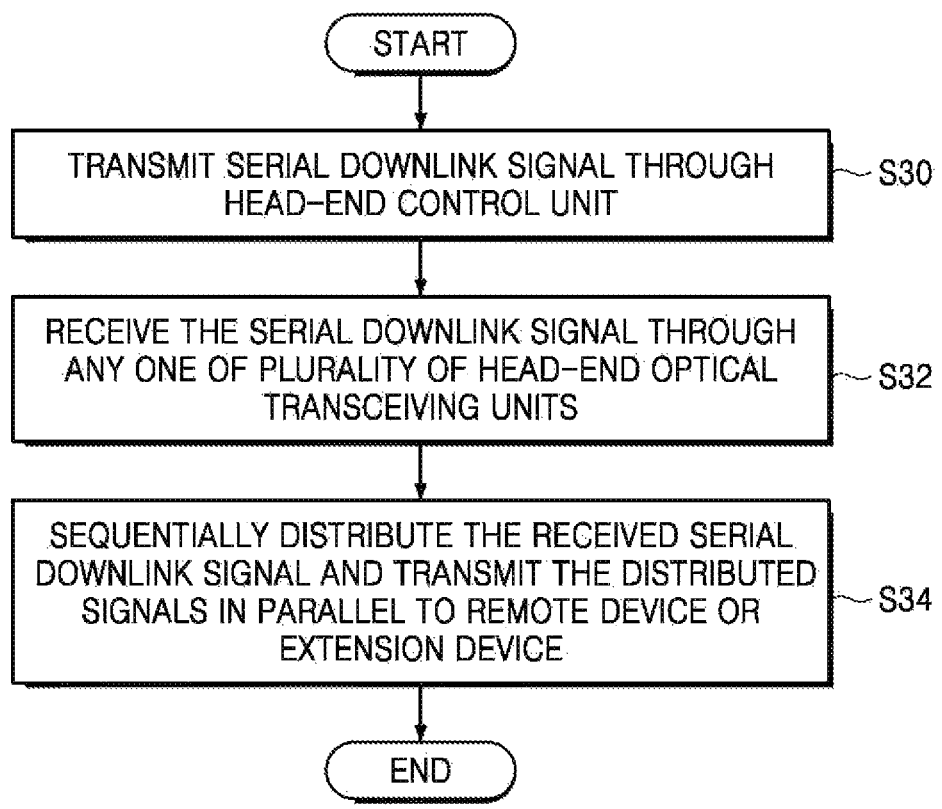
FIG. 10 is a flowchart of a method of operating the distributed antenna system in downlink communication in FIG. 1.

FIG. 10 is a flowchart of a method of operating the DAS 200 in downlink communication in FIG. 1.

Referring to FIGS. 1 to 4 and 10, in operation S30, one of the plurality of base station interfacing units 212-1 to 212-4, for example, the first base station interfacing unit 212-1, may transmit serial downlink signal through the head-end control unit 214.

In operation S32, one of the plurality of head-end optical transceiving units 216-1 to 216-4, for example, the first head-end optical transceiving unit 216-1, may receive serial downlink signal.

In operation S34, each of the plurality of head-end optical transceiving units 216-1 to 216-4 may sequentially distribute the received serial downlink signal and transmit the distributed signals in parallel to the remote device 220 or the extension device 230.

Figure 11:
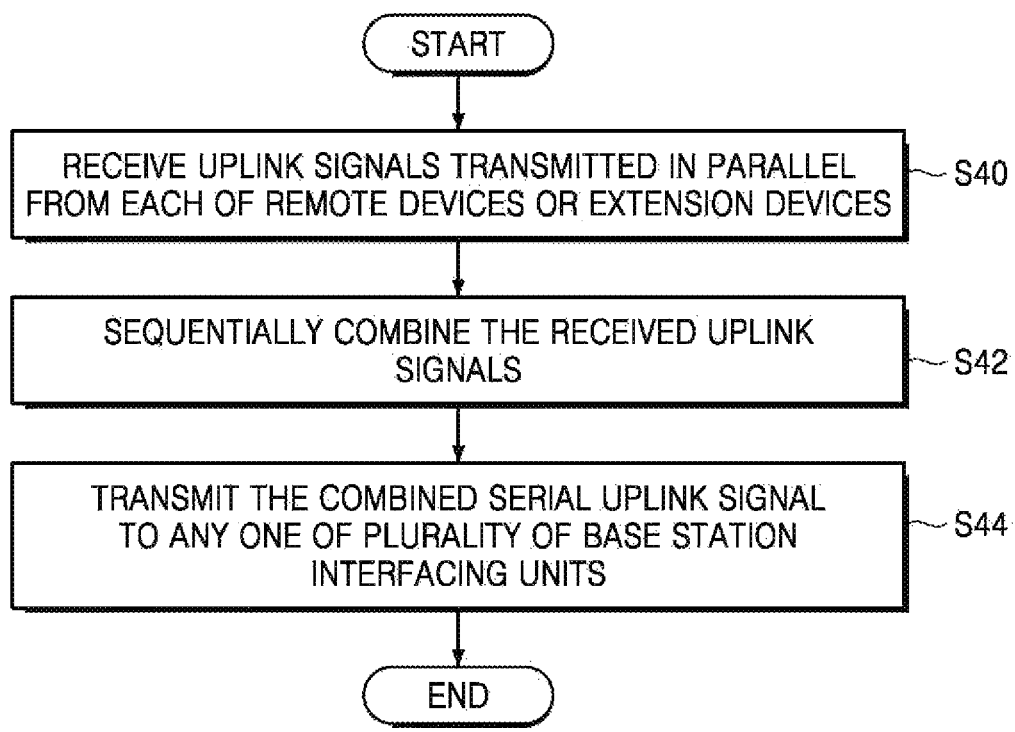
FIG. 11 is a flowchart of a method of operating the distributed antenna system in uplink communication in FIG. 1.

FIG. 11 is a flowchart of a method of operating the DAS 200 in uplink communication in FIG. 1.

Referring to FIGS. 1, 5 to 7 and 11, in operation S40, each of the plurality of head-end optical transceiving units 216-1 to 216-4 may receive uplink signals transmitted in parallel from each of the remote devices 220 or the extension devices 230.

In operation S42, the plurality of head-end optical transceiving units 216-1 to 216-4 may sequentially combine the received uplink signals.

According to an embodiment, each of the plurality of head-end optical transceiving units 216-1 to 216-4 may sequentially combine the uplink signals with from an upper head-end optical transceiving unit, for example, the fourth head-end optical transceiving unit 216-4, to a lower head-end optical transceiving unit, for example, the first head-end optical transceiving unit 216-1.

In operation S44, any one of the plurality of head-end optical transceiving units 216-1 to 216-4, for example, the first head-end optical transceiving unit 216-1, may transmit combined serial uplink signal to any one of the base station interfacing units 212-2 to 212-4, for example, the first base station interfacing unit 212-1.

The method and device according to embodiments of the inventive concept may simplify a circuit of a head end by using a serial transmission method in a head end, thereby realizing a head end with a more efficient structure.

While one or more embodiments have been described with reference to the figures, it will be understood by those of ordinary skill in the art that various changes in form and details may be made therein without departing from the spirit and scope of the disclosure as defined by the following claims.

What is claimed is:

1. A head-end device comprising:
a head-end control unit that receives a serial downlink signal transmitted from one of a plurality of base station interfaces; and
a plurality of head-end transceivers that receive the serial downlink signal output from the head-end control unit, distribute the received serial downlink signal, and transmit the serial downlink signal in parallel to a remote device or an extension device,
wherein one of the plurality of head-end transceivers receives the serial downlink signal and sequentially distributes the serial downlink signal to remaining head-end transceivers,
wherein each of the plurality of head-end transceivers includes a plurality of sub head-end transceivers, and
wherein one of the plurality of sub head-end transceivers receives the serial downlink signal, and distributes the serial downlink signal to at least one remaining sub head-end transceiver.

2. The head-end device of claim 1, wherein the one of the plurality of head-end transceivers is an uppermost head-end transceiver from among the plurality of head-end transceivers.

3. The head-end device of claim 2, wherein each of the plurality of head-end transceivers includes a distributor that distributes an upper head-end transceiver signal transmitted from an upper head-end transceiver from among the plurality of head-end transceivers to a signal to be transmitted to the remote device or the extension device and a signal to be transmitted to a lower head-end transceiver.

4. A head-end device comprising:
a plurality of head-end transceivers that sequentially combine uplink signals received in parallel from each of remote devices or extension devices and output a combined serial uplink signal; and
a head-end control unit that receives the combined serial uplink signal transmitted from one of the plurality of head-end transceivers and transmits the combined serial uplink signal to one of a plurality of base station interfaces,
wherein each of the plurality of head-end transceivers includes a plurality of sub head-end transceivers, and
wherein a lower sub head-end transceiver from among the plurality of sub head-end transceivers generates a combined signal by combining a signal transmitted from an upper sub head-end transceiver and an uplink signal directly received by the lower sub head-end transceiver, and outputs the combined signal.

5. The head-end device of claim 4, wherein the one of the plurality of head-end transceivers is a lowermost head-end transceiver from among the plurality of head-end transceivers.

6. The head-end device of claim 5, wherein each of the plurality of head-end transceivers includes a combiner that combines an upper head-end transceiver signal transmitted from an upper head-end transceiver from among the plurality of head-end transceivers and an uplink signal directly received by a corresponding head-end transceiver.

7. A method of operating a head-end device comprising:
transmitting a serial downlink signal, in which all of downlink signals received by each of a plurality of base station interfaces are combined, to one of a plurality of head-end transceivers through a head-end control unit;
receiving the serial downlink signal through the one of the plurality of head-end transceivers; and
sequentially distributing the received serial downlink signal and transmitting the distributed serial downlink signals in parallel to a remote device or an extension device,
wherein each of the plurality of head-end transceivers includes a plurality of sub head-end transceivers, and
wherein one of the plurality of sub head-end transceivers receives the serial downlink signal, and distributes the serial downlink signal to at least one remaining sub head-end transceiver.

8. A method of operating a head-end device comprising:
receiving uplink signals transmitted in parallel from each of remote devices or extension devices, through a plurality of head-end transceivers;
sequentially combining the received uplink signals to generate a combined serial uplink signal; and
transmitting the combined serial uplink signal to one of a plurality of base station interfaces through a head-end control unit,
wherein each of the plurality of head-end transceivers includes a plurality of sub head-end transceivers, and
wherein a lower sub head-end transceiver from among the plurality of sub head-end transceivers generates a combined signal by combining a signal transmitted from an upper sub head-end transceiver and an uplink signal directly received by the lower sub head-end transceiver, and outputs the combined signal.

* * * * *